Patented Apr. 6, 1926.

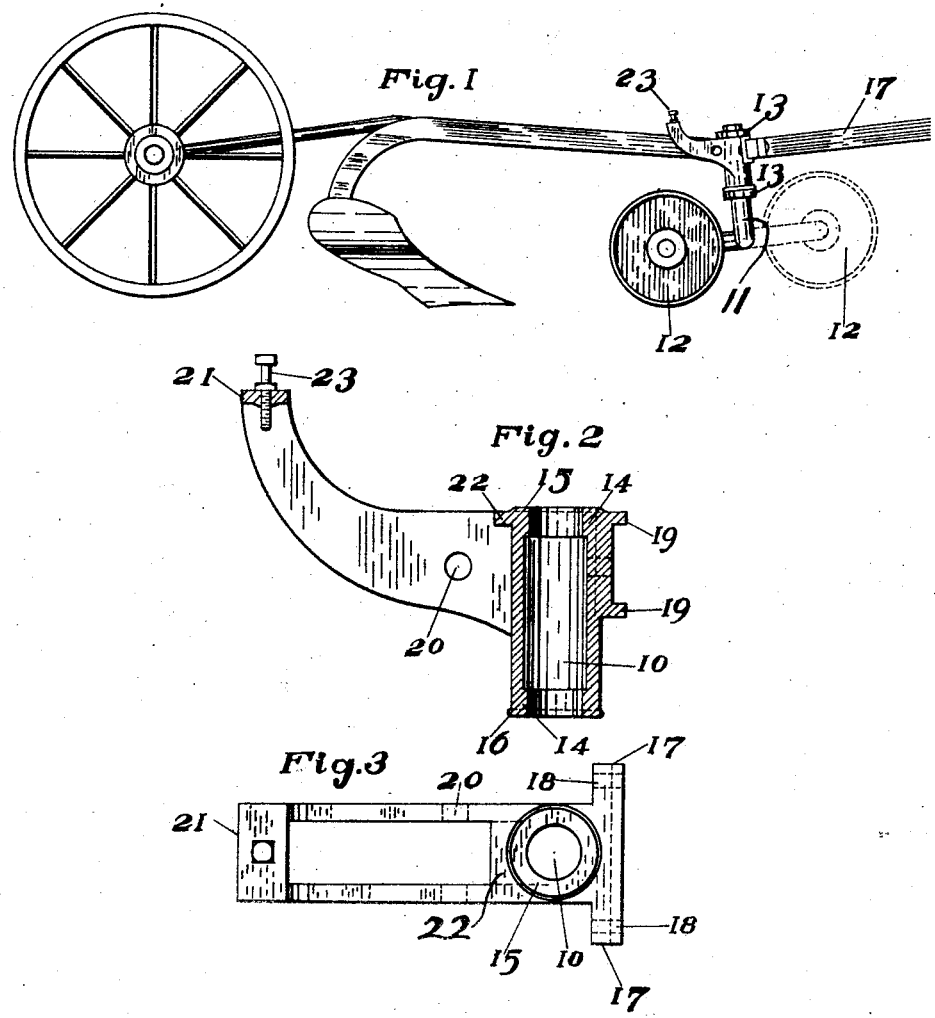

1,579,689

UNITED STATES PATENT OFFICE.

LEON W. CHASE, OF LINCOLN, NEBRASKA, ASSIGNOR TO CHASE PLOW COMPANY, OF LINCOLN, NEBRASKA, A CORPORATION OF NEBRASKA.

CASTER-WHEEL BRACKET.

Application filed May 14, 1925. Serial No. 30,371.

*To all whom it may concern:*

Be it known that I, LEON W. CHASE, a citizen of the United States, and a resident of Lincoln, in the county of Lancaster and State of Nebraska, have invented certain new and useful Improvements in Caster-Wheel Brackets, of which the following is a specification.

My invention relates to caster wheel brackets in the draft appliances of certain farm implements such as lister plows, its primary object being the elimination of a defect which is common in nearly all implements.

In lister plows and in similar implements the implement beam and the draft beam are usually connected by a horizontal pivot pin, the two beams forming an angle the vertex of which is at the lower extremities of the beams. There is also usually a caster wheel or other similar support at the pivot. In the forward movement of the implement, the pull on the draft beam and the resistance of the implement on the implement beam tend to urge the two beams toward a straight line relation, or in other words, there is a slight tendency for the pivotal point to assume a higher level and to thus relieve the pressure on the caster wheel. In backing up the implement, however, the thrust of the draft beam is rearward and downward against the pivotal point, and the downward pressure on the caster wheel is materially increased. If the soil is soft and not sufficiently resistant, the caster wheel will dig in and make further backing difficult, and the forward end of the draft beam is thrust upwardly to still further complicate matters. In brief, the object of my invention is the provision of means for adjustably limiting the angular movement of the draft and implement beams relative to each other when backing the implement. Other and more specific objects will be pointed out in the following description.

Figure 1 is a view in side elevation of the caster wheel bracket in its relation to the draft and implement beams of a lister plow, only those parts of the implement being shown which affect the action at the pivotal connection between the two beams.

Figure 2 is a median vertical sectional view of the caster wheel bracket.

Figure 3 is a top plan view of the caster wheel bracket.

The caster wheel bracket is shown in detail in Figures 2 and 3. Toward its forward extremity it has a vertical cylindrical aperture 10 extending therethrough for receiving the stem 11 of the caster wheel 12. The usual collars 13 surround the stem 11 immediately above and beneath the caster wheel bracket, the collars 13 being secured to the stem 11 by means of set screws which prevent any displacement of the parts. The wall of the aperture 10 is provided with shoulders 14 to reduce the friction surface between the caster wheel bracket and the stem 11, and also to provide a relatively large lubricant container surrounding the stem. Friction between the caster wheel bracket and the upper collar 13 is reduced by means of a collared projection 15 integral with and projecting slightly above the caster wheel bracket and surrounding the aperture 10. At the bottom extremity of the apertured portion of the caster wheel bracket is a flange 16 whose external diameter is substantially equal to that of the collared projection 15.

The caster wheel bracket is designed to be secured rigidly to the draft beam 17 at the rear extremity thereof. The forward end of the caster wheel bracket has vertical ears 17 projecting laterally therefrom, each of the ears being apertured at 18, the apertures 18 being designed for receiving the bolts whereby the draft beam is secured to the caster wheel bracket. It should be noted, however, that in the particular implement on which the caster wheel bracket is first being used, there are two lister plows in a single frame, the beams of the two plows being connected at their forward extremities by means of a transverse draft beam to which a tongue or other forwardly extending draft appliance is secured. In this implement, the transverse draft beam is secured at each of its ends to a caster wheel bracket through a pair of bolt holes 18, the transverse draft beam being further held against vertical displacement by the horizontal flanges 19 projecting forwardly from the caster wheel bracket.

The rear portion of the caster wheel bracket comprises a rearwardly and upwardly extending yoke for receiving the forward extremity of the plow beam which is pivotally secured to the caster wheel bracket through the aligning apertures 20 in the yoke. The web 21 at the rear end of the yoke thus limits the angular movement of the plow beam relative to the forwardly extending draft beam. At the forward portion of the yoke is another web 22 which serves both as a brace and as a stop for the forward end of the plow beam. The pivotal movements of the plow beam are thus limited in both directions.

During the forward movement of the implement, there is a tendency for the pivotal point 20 to move upwardly, due to the upward and forward pull on the draft beam. This tendency is, however, at least partly counteracted by the suck of the plow, the combined effect being that there is relatively little downward pressure of the caster wheel on the soil. In backing, the push on the draft beam is downward and rearward, which materially increases the pressure of the caster wheel on the soil, and this pressure is still further increased when the plow leaves the furrow and elevates the rear end of the plow beam. The downward pressure on the pivotal point 20 is thus rapidly increased, so that when no stop is provided for limiting this movement the caster wheel will dig deeply into the soil, making further backing exceedingly difficult or impossible. The trouble is further aggravated by the tendency of the forward end of the draft beam to rise as the caster wheel sinks. These difficulties are entirely eliminated by the use of the caster wheel bracket above described. The downward movement of the pivotal point 20 ceases when the plow beam comes in contact with the under side of the stop 21 and the plow and draft beams are then held in rigid angular relation during the further backing movement of the implement.

The tendency of the caster wheel to dig in during backing is of course greatest when the soil is very soft, and least when the surface soil is very hard. It follows then that the degree of pivotal movement permitted between the plow and draft beams is largely dependent on the character of the soil and on several other factors. The stop is therefore made adjustable, preferably by means of a set screw 23.

While I have described my invention in very specific terms, it is to be understood that various changes and modifications may be made without departing from the spirit of the invention which I claim, and my claims are to be construed as embodying such modifications as fall within their scope. This is particularly true of shoes and other supports which are recognized as mechanical equivalents of caster wheels.

Having thus described my invention in terms which will be readily understood by others skilled in the art to which it pertains, what I claim as new and desire to secure by Letters Patent of the United States is:—

1. A draft beam, a caster wheel bracket rigidly secured thereto, a second draft beam pivotally secured to said caster wheel bracket, and a yoke integral with said caster wheel bracket, said yoke straddling said second draft beam at a point remote from the pivotal connection of said second draft beam and said caster wheel bracket.

2. The combination of a bracket, a draft beam secured thereto by means of a horizontally positioned pivot, a second draft beam rigidly secured to said bracket, said two draft beams being adapted to assume a position in alignment with each other, and a yoke integral with said bracket, said yoke straddling said first named draft beam and being adapted to limit the pivotal movement of said first named draft beam on said bracket.

3. In combination with a forwardly and rearwardly extending draft beam, a bracket rigidly secured thereto at its rear extremity, said bracket being provided with a vertical aperture for the reception of the stem of a caster wheel, said bracket being adapted to be pivotally connected to an implement beam at the forward extremity thereof, and an adjustable abutment integral with said bracket for engaging the upper surface of said implement beam for limiting the pivotal movement between said draft and implement beams.

4. A caster wheel bracket including a vertical cylindrical portion which is adapted to receive the stem of a caster wheel, means forward of said cylindrical portion for rigidly securing said caster wheel bracket to a draft beam at the rear extremity thereof, means in the rear of said cylindrical portion for pivotally securing said caster wheel bracket to an implement beam at the forward extremity thereof, and rigid means integral with said cylindrical portion for engaging the upper surface of the implement beam for limiting the pivotal movement of the draft beam relative to the implement beam, said rigid means being adjustable.

5. A caster wheel bracket including a vertical cylindrical portion which is adapted to receive the stem of a caster wheel, means forward of said cylindrical portion for rigidly securing said caster wheel bracket to a draft beam at the rear extremity thereof, a yoke projecting rearwardly and upwardly from said cylindrical portion, and means for pivotally securing an implement beam in said yoke, the upper portion of said yoke serving as a stop to limit the pivotal movement of said bracket relative to the implement beam.

6. A caster wheel bracket including a vertical cylindrical portion which is adapted to receive the stem of a caster wheel, the walls of said cylindrical portion having inwardly projecting shoulders at both extremities thereof, a horizontal transverse member integral with and forward of said cylindrical portion, said transverse member having forwardly projecting upper and lower flanges and being provided with apertures whereby it may be rigidly secured to a draft beam, a yoke integral with and projecting rearwardly and upwardly from said cylindrical portion, said yoke being provided with horizontal aligning apertures whereby the forward portion of an implement may be pivotally secured in said yoke, and a set screw in the upper end of said yoke, said set screw being adapted to adjustably limit the pivotal movement of said caster wheel bracket relative to the implement beam.

In witness whereof I affix my signature.

LEON W. CHASE.